Feb. 27, 1951 J. N. KUZMICK 2,543,111
APPARATUS FOR MOLDING PLASTIC SLIDE FASTENERS
Filed May 14, 1947 3 Sheets-Sheet 1

*INVENTOR.*
JOSEPH N. KUZMICK
BY *James and Franklin*
ATTORNEYS

INVENTOR.
JOSEPH N. KUZMICK
BY *James and Franklin*
ATTORNEYS

Feb. 27, 1951            J. N. KUZMICK            2,543,111

APPARATUS FOR MOLDING PLASTIC SLIDE-FASTENERS

Filed May 14, 1947            3 Sheets-Sheet 3

INVENTOR.
JOSEPH N. KUZMICK
BY James and Franklin
ATTORNEYS

Patented Feb. 27, 1951

2,543,111

UNITED STATES PATENT OFFICE 2,543,111

APPARATUS FOR MOLDING PLASTIC SLIDE FASTENERS

Joseph N. Kuzmick, Clifton, N. J., assignor to Conmar Products Corporation, Newark, N. J., a corporation of New Jersey Application May 14, 1947, Serial No. 747,970

29 Claims. (Cl. 18—30)

1

This invention relates to slide fasteners, especially plastic slide fasteners, and more particularly to apparatus for molding the same.

The primary object is to generally improve the molding of plastic slide fasteners. A more particular object is to provide apparatus which will make it possible to mold such fasteners out of thermosetting as well as thermoplastic material, the thermosetting material having many known advantages in the way of resistance to the heat used in laundering and ironing, and the solvents used in dry-cleaning. However, thermosetting materials are far more difficult to mold than thermoplastic materials, because all of the material must be cleared from the apparatus after each molding cycle.

Another object of the present invention is to provide apparatus which will mold an entire stringer or length of slide fastener at one time. An ancillary object is to mold end stops along with the fastener elements. A still further object is to mold both of the mating stringers of the slide fastener at the same time.

An important object of the present invention is to feed the molding material to each of the mold cavities for the individual elements through a short straight gate, the amount of material and the pressure under which the material is supplied to each of the cavities being substantially uniform. With this object in view, the material is supplied to the mold cavities by a method somewhat akin to transfer molding, but the transfer chamber takes the form of a long passage having parallel sides and extending collaterally of and preferably between the rows of elements. The transfer plunger takes the form of a long blade or bar, and the conventional pill of molding material is replaced by a long slender rod or wire of molding material which is delivered to the transfer chamber.

In accordance with a further feature and object of the invention, the transfer chamber is fitted with an ejector blade, as well as the previously mentioned transfer blade, the molding material being compressed between the ejector blade and the transfer blade. A longitudinally reciprocable carrier is provided to deliver the rod of molding material to the mold, and the aforesaid ejector blade may be used to eject the rod from the carrier to the transfer chamber. For better control of the tapes and to further aid in the ejection of the molded elements from the molds, tape clamps and appropriate means for operating the same are provided in cooperation with the mold.

To accomplish the foregoing objects, and other more specific objects which will hereinafter appear, my invention resides in the molding apparatus and the parts thereof and their relation one to another, as are hereinafter more particularly described in the following specification. The

2 specification is accompanied by drawings, in which:

Fig 1. is a partially sectioned elevation of molding apparatus embodying features of my invention;

Figure 2:
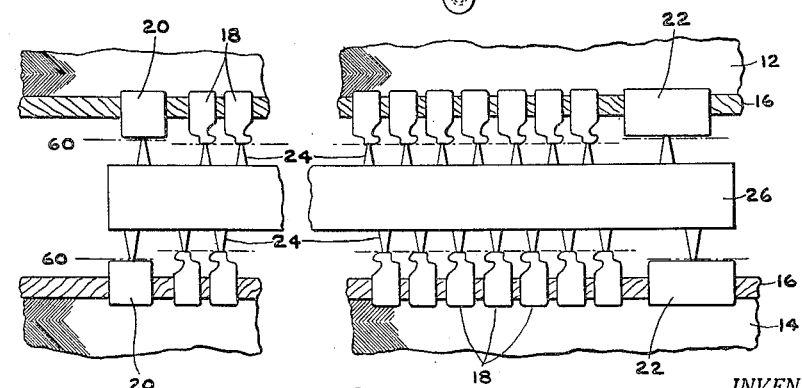
Fig. 2 is a plan view of the molded product as ejected from the mold.

Referring to the drawing, and more particularly to Fig. 2, a pair of tapes 12 and 14 having the usual beaded edge 16, have fastener elements 18 molded thereon. These elements are preferably of the open-sided type, that is, the recesses are open to the sides of the elements, so that the elements may be molded between the halves of a simple two-part mold, and without necessitating the use of movable cores. An element of this character is disclosed in United States Letters Patent 2,394,211 to George A. Siff, granted February 5, 1946. All of the elements for a single stringer length are molded simultaneously, and if desired, top stops 20 and the halves 22 of a bottom stop may be molded on the tapes along with the fastener elements. The stops here indicated are of a type disclosed in my copending application, Serial No. 770,471, filed August 25, 1947, now abandoned. After adding a slider and meshing the two stringers together, the halves 22 of the bottom stop may be cemented together.

It is important to note that each of the elements has been supplied with molding material through a short direct gate 24. The gates are uniform, and may be kept short and direct as shown, because they are supplied with molding material from a body of molding material extending collaterally of the tapes. The residue of unused molding material is indicated at 26.

Figure 11:
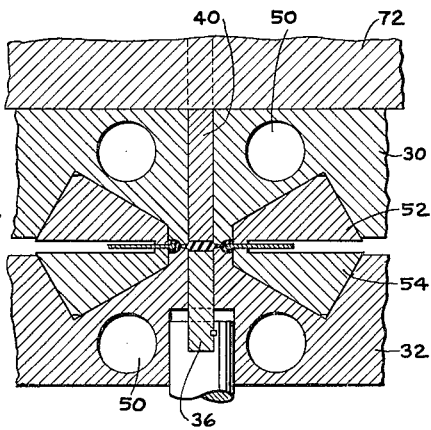
Figure 10:
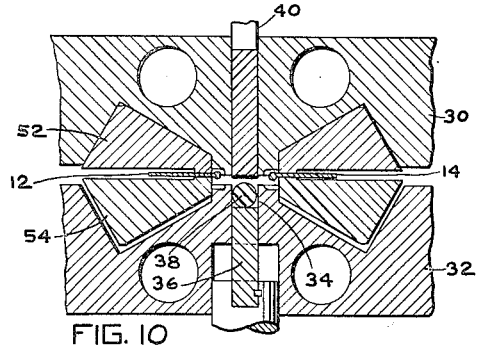

The underlying idea will be clear from comparison of Figs. 10 and 11 of the drawing. The mold is made up of an upper half 30, and a lower half 32, between which the tapes 12 and 14 are clamped. The molds have mating cavities for the individual fastener elements, and in addition, the mold 32 has a transfer chamber 34. This takes the form of a long slender passage with parallel side walls, in which a transfer blade 36 is movable. The molding material is most conveniently supplied in the form of a long slender rod or wire shown at 38. It will be evident that by closing the mold and then forcing the transfer blade 36 upwardly as shown in Fig. 11, the molding material is compressed within the transfer chamber and extruded sidewardly through the gates into the mold cavities, thus forming the fastener elements directly around the beaded edges of the tapes.

Figure 12:
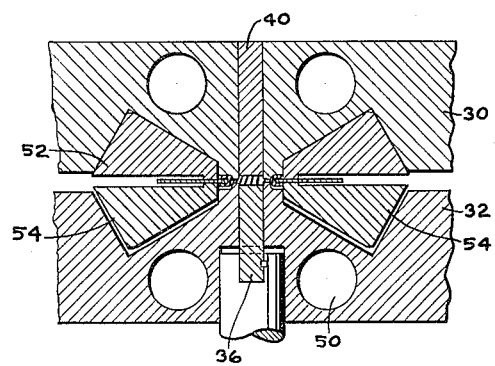
Figure 13:
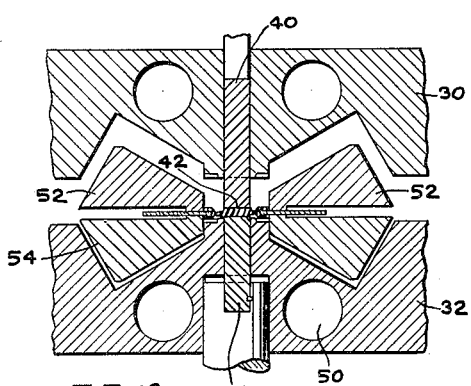

Referring now to Fig. 13, it will be seen that the upper half 30 of the mold, instead of being solid across the top of the pressure chamber, is provided with an ejector blade 40. This is movable independently of the mold 30, and therefore may be used to press downwardly on the residue 42 of molding material, thereby dislodging the same and with it the gates and elements from the upper half of the mold. To understand this it is merely necessary to compare the elevated or molding position of ejector blade 40 shown in Fig. 12, with the lowered or ejection position of blade 40 shown in Fig. 13. (Actually the upward movement of the blade 40 may be arrested, while the upward or opening movement of the upper mold 30 is continued.)

Figure 14:
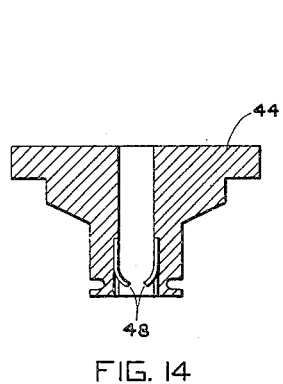
Fig. 14 is explanatory of a detail of the invention.
Figure 8:
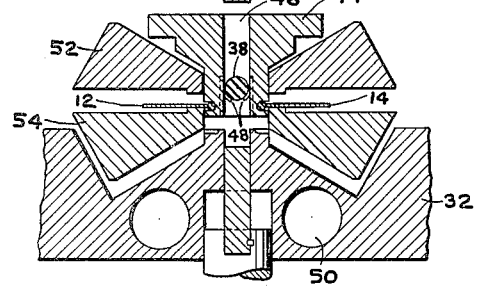
Figure 9:
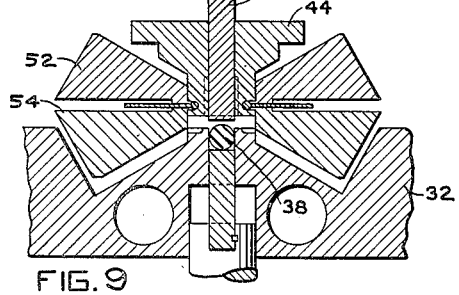

The ejector blade is also employed in the present apparatus as a means for completing the delivery of the rod 38 of molding material to the transfer chamber. Referring to Fig. 8, it will be seen that the rod 38 is initially moved into the mold (then wholly open) by means of a carrier 44, the said carrier being slidable longitudinally with the rod 38, between a position wholly outside the mold, and a position between the halves of the open mold. The carrier 44 has a passage 46 which is open at the top and bottom, and which is dimensioned to receive the ejector blade 40. The rod is held against falling downward by means of some tiny spring fingers 48, best shown in Fig. 14. Fig. 9 shows how descent of the blade 40 pushes the rod 38 downwardly past the spring fingers and into the subjacent transfer chamber. The blade 40 is again raised, and carrier 44 is then moved out of the mold, following which the mold may be closed. In Fig. 10 the mold is nearly but not quite closed, while in Fig. 11 the mold is closed, and the transfer blade 36 has also been forced upwardly to compress the molding material.

It will be noted that the mold 30, 32 is provided with suitable heating means, here exemplified by passages 50, through which a suitable heating medium such as steam may be run. Also electrical resistance units may be placed in the passages.

Figure 7:
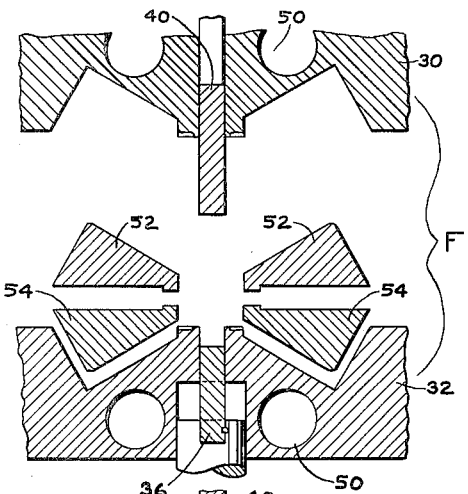
Figs. 7 through 13 are cross-sections through the mold, taken approximately in the plane of the line 7—7 of Fig. 5, and showing the relation of the parts of the apparatus during successive phases of a single molding cycle.

As so far described the mold would be a simple two-part mold, except for the transfer blade 36 and the ejector blade 40. However, a refinement which I believe desirable is the use of tape clamps, shown at 52 and 54 in the drawing. In Fig. 7 the clamps are shown separated or in open position. In Fig. 8 they are still open, but the tapes 12 and 14 have been moved into position between the clamps. In Fig. 9 the clamps have been closed against the tapes, thereby holding the tapes against movement. At this time the mold is still open. The clamps hold the tapes against movement, as for example during retraction of the carrier 44 shown in Fig. 9. The clamps are useful not only for this purpose, but also to aid ejection of the molded fastener from the mold cavities. This will be understood from comparison of Figs. 11, 12 and 13 of the drawing. In Fig. 12 the mold has begun to open, and it will be noticed that the bottom clamps 54 have risen somewhat above the lower half 32 of the mold. This tends to raise the fastener slightly relative to the lower half of the mold. In Fig. 13 the upper half 30 of the mold has continued to rise, but the upper clamps 52 are held stationary, thereby stripping the molded fastener from the upper half of the mold. At the same time the ejector blade 40 is held stationary, so that the strip or residue 42 of molding material is maintained in position with the tapes and clamps. The next step, of course, is for the clamps themselves to open as shown in Fig. 7, whereupon the tapes with the molded elements may be moved longitudinally through the mold preparatory to the next molding cycle. By moving the tapes an amount equal to the stringer length plus the desired gap spacing between stringers, a continuous chain of stringers is provided ready for subsequent operations in the clamp. A first operation is to cut the fastener elements free of the gates, and this is done along the lines marked 60 in Fig. 2. Severance along these lines is obtained by means of trimming rolls shown at 62 in Fig. 1.

Figure 1:
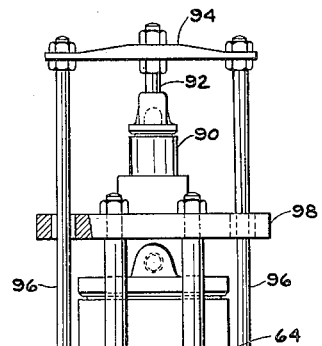

One possible form of mechanism for operating the aforesaid apparatus elements is illustrated in Fig. 1 of the drawing. The mold is opened and closed by means of a main clamp cylinder 64. The lower end of this cylinder is bolted to a stationary platen 66, which in turn is connected by means of tie rods 68 to the bed of the machine. The ram of cylinder 64 is connected through piston rod 70 to a movable platen 72 which carries the upper half of the die. The tie rods 68 and movable platen 72, as well as the plunger 70 for operating the same, are shown to somewhat larger scale in Fig. 5 of the drawing.

Figure 5:
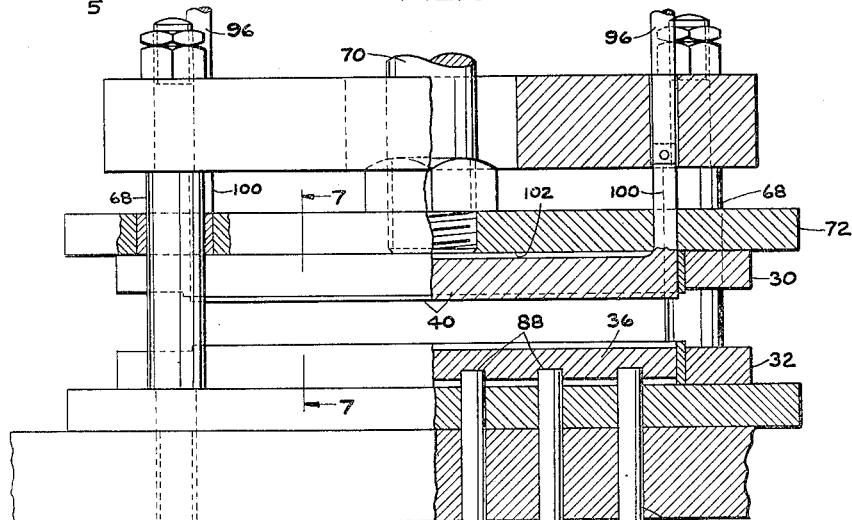
Fig. 5 is a partially sectioned elevation of the mold, the section being taken approximately in the planes of the lines 5—5 of Fig. 3, and with the tape clamps removed to simplify the drawing.

The transfer blade 36 is operated by means of a cylinder 74 shown at the bottom of Fig. 1. The head 76 of this cylinder is secured to and spaced from the bed 80 of the machine by means of tie rods 82. The transfer ram is connected through a plunger 84 to a cross-head 86. This in turn carries a series of spaced pushers 88. These are best shown in Fig. 5, in which it will be seen that the lower ends of the pushers 88 are received in the cross-head 86, and that the upper ends act on transfer blade 36.

Reverting to Fig. 1, the ejector blade is actuated by means of a small cylinder 90, the piston rod 92 of which is connected to cross-head 94, the spaced ends of which carry rods 96 slidable in the stationary heads 98 and 66. The lower ends of the rods 96 are connected to the ejector blade 40 in a manner which is best shown in Figs. 5 and 6, the blade having upward extensions 100 formed integrally therewith, and connected to the lower ends of the rods 96.

It may be explained that the rods 96 do not have to withstand the transfer pressure. When the mold is closed the top edge of the ejector blade 40 backs solidly against the mold carrying platen 72. In Fig. 5 a slight space is shown at 102, the ejector blade being lowered somewhat. However, by referring to Fig. 11 of the drawing, it will be seen that when the mold is closed the ejector blade 40 backs solidly against the platen 72.

Figure 3:
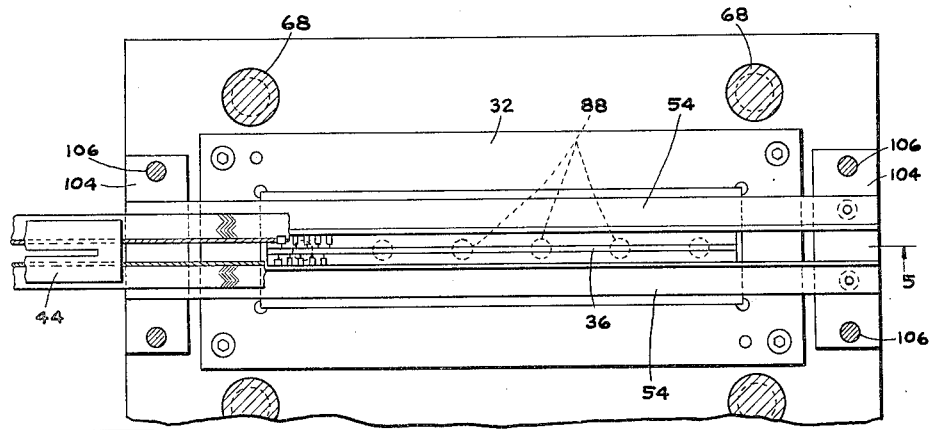
Fig. 3 is a plan view of the lower half of the mold, showing the tape clamps and a short length of the tapes.
Figures 4, 6:
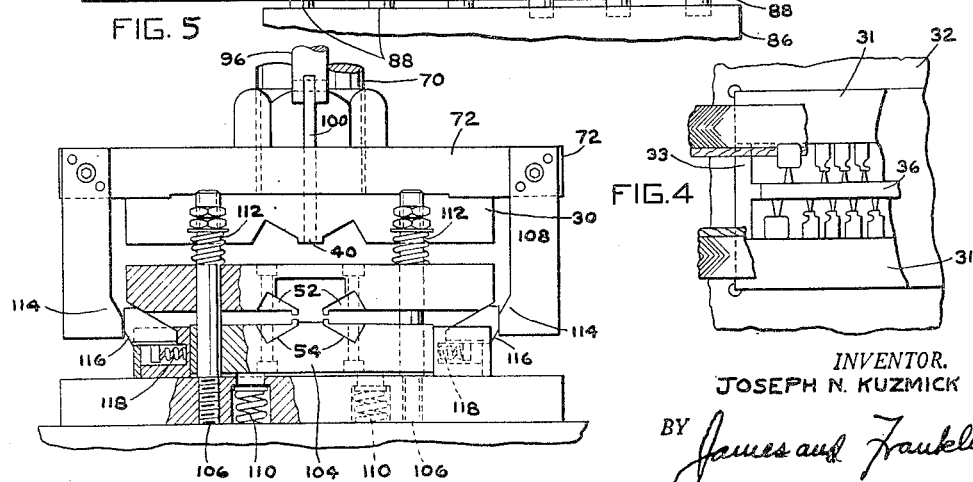
Fig. 4 is a fragmentary view of a part of the lower half of the mold, drawn to enlarged scale.
Fig. 6 is a partially sectioned end view of the mold, showing the tape clamps and the mechanism for actuating the same.

The manner in which the tape clamps are operated will be understood by reference to Figs. 3 and 6 of the drawing. In Fig. 3 it will be noted that the bottom clamps 54 extend beyond the lower half 32 of the mold, the ends of the clamps being connected to cross-bars 104, the said cross-bars being vertically slidable on stationary pins 106. In Fig. 6 it will be seen that the upper tape clamps 52 are connected by cross-bars 108, just as the lower tape clamps 54 are connected by cross-bars 104. The lower cross-bars 104 are urged upwardly by compression springs 110. The upper cross-bars 108 are urged downwardly by means of compression springs 112. The tension of the upper springs 112 is adjusted to be somewhat less than that of the lower springs 110. This permits the upper clamps to be moved down against the lower clamps, in order to anchor the tapes in position, as was described in connection with Figs. 8 and 9 of the drawing. The lower springs meanwhile hold the clamps slightly above the lower half of the mold. However, when the mold closes, the upper half of the mold bears against the top clamps, and forces the clamps bodily downwardly against the lower half of the mold, as is shown by the change in position from Fig. 10 to Fig. 11. The molds are recessed to just fit the tape clamps, and to ensure tight clamping of the tapes during the molding operation. This is a positive clamping action under hydraulic pressure, and is not to be confused with the initial clamping pressure which depends on the action of the springs 112 (Fig. 6). The initial clamping pressure is adequate to hold the tapes against movement during retraction of the rod carrier 44 (Fig. 9).

It has already been mentioned that the clamps are also useful for ejection purposes. Referring to Fig. 6, it will be evident that the action of the bottom springs 110 is alone sufficient to strip the tapes from the lower half of the mold when the mold opens. The continued upward movement of the upper half of the mold, unaccompanied by a corresponding upward movement of the tape clamps, will strip the tapes from the upper half of the mold. At this time the ejector blade 40 is held down as shown in Fig. 13 to help strip the stringers from the mold, but thereafter the ejector blade is raised as shown in Fig. 6. The tape clamps must then be opened to release the tapes for feed out of the mold, and to bring fresh lengths of tape into the mold preparatory to the next molding cycle. This is done by a cam and wedge mechanism shown in Fig. 6, the upper mold plate 72 carrying cams 114, which bear against wedges 116, and urge the same inwardly against compression springs 118. The wedges 116 bear against the upper cross-bar 108, and raise it against the action of the top springs 112. When the cross-bars 108 rise, they take the tape clamps 52 along, thus opening the clamps to the position shown in Figs. 6, 7 and 8.

When the mold is wide open, and the clamps are released, the stringers may be moved out of the mold, and the carrier may be moved into the mold with a fresh rod of molding material. Reverting to Fig. 1, the apparatus includes a horizontal cylinder 120, the piston rod 122 of which is connected to a cross-head 124. This moves a gear rack 126, which through an appropriate gear and uni-directional clutch, causes rotation of tape feed roll 128, which in turn rotates feed roll 130. The rolls 128, 130 pull the stringers 132 out of the mold.

The cross-head 124 when moved to the right draws with it a horizontal link 134 connected by means of a vertical strut 136 to the rod carrier 44 previously referred to. The rod carrier slides in stationary ways 138 mounted on the bed 80 of the machine.

Referring to Fig. 4, the die construction may be simplified by using inserts 31, spaced at 36, the said spacing being maintained by end pieces 33. The pieces 31 and 33 are set into the mold half 32. Similar parts are used for the upper mold half 30.

It is believed that the construction and operation, as well as the advantages of my improved apparatus for molding plastic slide fasteners, will be apparent from the foregoing detailed description thereof. The pair of tapes are threaded horizontal through the machine, and downwardly between the tape feed rolls 128 and 130. The tapes run between the upper and lower halves of the mold, and more specifically, between the tape clamps. The tapes also run within the ways or tracks 138 for the rod carrier, and the outer walls of the carrier near the bottom thereof are grooved to receive the beaded edges of the tape, as is clearly shown in Figs. 8 and 14 of the drawing. A long slender rod of molding material is dropped into the carrier, the carrier then being disposed outside the mold. While not illustrated in the drawing, it may be mentioned that a hopper may be provided above the carrier, said hopper carrying a large supply of rods which are permitted to fall into the carrier one at a time for each cycle of operation. However, in the simpler form of the machine here illustrated, it may be assumed that a rod is simply dropped manually into the carrier while the carrier is outside the mold. Operation of the horizontal cylinder feeds the tapes and the carrier to the right, as viewed in Fig. 1, until the carrier is in the mold, with the rod disposed directly over the transfer chamber. Preliminary descent of the ejector blade pushes the rod out of the carrier into the transfer chamber. The carrier then returns to initial position, it being understood that the tapes are not moved back at this time because the gear and rack mechanism includes a uni-directional clutch, and the feed wheels include a check pawl to prevent reverse movement. The mold closes, and the timing may be such that the initial closing movement precedes retraction of the carrier, in which case the clamps hold the tapes during retraction of the carrier. However, this is not essential for the tapes would anyway be restrained by the feed wheels. When the mold is completely closed, the clamps bear tightly on the tapes. The clamps also bear tightly inwardly against the molds at the outer ends of the mold cavities, this being so by reason of the approximately triangular or wedge-shape between the tape clamps and the mold. At this time the ejector blade is held positively against upward movement, because the top edge of the blade backs solidly against the mold plate. During this time the heat of the mold softens the molding material. The transfer blade is then actuated, and its upward movement compresses the softened rod of molding material, and extrudes it outwardly into both sets of mold cavities. The supply of material to all of the cavities is substantially uniform, because of the short, direct, uniform nature of the gates.

After a suitable curing time to afford reaction of the thermosetting material, the mold begins to open. At first the tape clamps rise, thereby stripping the tapes from the lower half of the mold. The upper half of the mold rises further without the tape clamps, and without the ejector blade, thereby stripping the tapes from the upper half of the mold. The ejector blade is then raised, and as the mold nears its fully open position the cam and wedge mechanism forces the tape clamps apart, thereby releasing the tapes preparatory to the next feed movement of the horizontal cylinder, the said feed movement not only moving the finished stringers out of the mold, but also moving a new rod of molding material into the mold. During delivery of the stringers from the mold, the residue and gates may be cut from the elements by appropriate trimming wheels.

It will be understood that while I have described the invention as applied to the molding of thermosetting plastics, it may also be used with thermoplastic materials, and for that matter with metals. It will also be understood that the valves for controlling the operation of the cylinders 64, 76, 90 and 120 may be of conventional character, and that these valves may themselves be controlled in properly timed relation by suitable control mechanism or timing mechanism. Such mechanisms may be purchased commercially, and include a master timing shaft or cam shaft with a series of cams for controlling the different valves in desired time sequence, the cam shaft being rotated by a small synchronous motor. By proper adjustment of the cams a desired molding time may be provided during which the mold remains closed.

It will be understood that although hydraulic means are shown for moving the various mold parts, the same movements may be derived by the use of toggle links as employed in mechanically-operated toggle presses. It will also be understood that while I have shown the molding material delivered to the mold by means of a carrier, the rod of molding material may be delivered in some other manner, as for example, by moving the same axially into the mold, or by manual loading of the mold while it is widely open. It will also be understood that it is not necessary to provide molding material in the form of a rod, and instead, a supply of loose molding material or molding powder may be provided, particularly when using a special carrier moved into and out of the mold.

It will also be understood that the use of separate tape clamps is a refinement not essential to practice of the invention. Although convenient, it is also not essential that mating pairs of stringers be molded at the same time.

These and other changes may be made, and it will therefore be apparent that while I have shown and described my invention in a preferred form, changes may be made without departing from the spirit of the invention, as sought to be defined in the following claims.

I claim:

1. Apparatus for molding a slide fastener stringer, said apparatus comprising mold halves separable in the plane of the slide fastener tape, each mold half having a row of mold cavities for the desired fastener elements, a transfer chamber in said mold, said chamber being a long thin parallel-sided chamber extending collaterally of the row of cavities, a row of gates formed in said mold and connecting the end of each cavity with said transfer chamber, said chamber and gates opening into the parting plane of the mold, said transfer chamber being open at the top and bottom and receiving two oppositely movable blades of equal thickness, one of said blades acting as a transfer blade, and the other of said blades acting as an ejector blade, said blades being movable in said transfer chamber in a direction transverse of the length of the blades and chamber, in order to compress molding material in the chamber and to thereby extrude the same through the gates into the cavities.

2. Apparatus for molding a slide fastener stringer, said apparatus comprising mold halves separable in the plane of the slide fastener tape, each mold half having a row of mold cavities for the desired fastener elements, a transfer chamber in said mold, said chamber being a long thin parallel-sided chamber extending collaterally of the row of cavities, a row of gates formed in said mold and connecting the end of each cavity with said transfer chamber, said chamber and gates opening into the parting plane of the mold, said transfer chamber being open at the top and bottom and receiving two oppositely movable blades, one of said blades acting as a transfer blade, and the other of said blades acting as an ejector blade, said blades being movable in said transfer chamber in a direction transverse of the length of the blades and chamber, in order to compress molding material in the chamber and to thereby extrude the same through the gates into the cavities, and means to deliver a long thin rod of molding material to the transfer chamber including a carrier slidable in a direction parallel to the tapes, said carrier being movable between a position outside the mold when the mold is closed, and a position between the halves of the mold when the mold is open, said carrier including a passage for carrying the rod of molding material, which passage is open at the top and bottom and is dimensioned to receive the ejector blade, whereby movement of the ejector blade ejects the rod of molding material from the carrier into the transfer chamber.

3. Apparatus for molding a slide fastener stringer, said apparatus comprising mold halves separable in the plane of the slide fastener tape, each mold half having a row of mold cavities for the desired fastener elements, a transfer chamber in said mold, said chamber being a long thin parallel-sided chamber extending collaterally of the row of cavities, a row of gates formed in said mold and connecting the end of each cavity with said transfer chamber, said chamber and gates opening into the parting plane of the mold, said transfer chamber being open at the top and bottom and receiving two oppositely movable blades, one of said blades acting as a transfer blade, and the other of said blades acting as an ejector blade, said blades being movable in said transfer chamber in a direction transverse of the length of the blades and chamber, in order to compress molding material in the chamber and to thereby extrude the same through the gates into the cavities, means to deliver a long thin rod of molding material to the transfer chamber including a carrier slidable in a direction parallel to the tapes, said carrier being movable between a position outside the mold when the mold is closed, and a position between the halves of the mold when the mold is open, tape clamps separate from the mold extending longitudinally of the tape between the halves of the mold for clamping and holding the tape outside the beaded edge of the tape, and means for moving said tape clamps relative to the mold.

4. Apparatus for molding two slide fastener stringers having plastic elements with open-sided recesses, said apparatus comprising mold halves separable in the plane of the slide fastener tapes, each mold half having two rows of mold cavities for the desired fastener elements and having additional cavities corresponding to end stops, a transfer chamber in said mold, said chamber being a long thin parallel-sided chamber extending collaterally between said rows of cavities and tapes, two rows of gate passages formed in said mold and connecting the end of each cavity with said transfer chamber, said chamber and gates opening into the parting plane of the mold, means to open and close the mold, tape feed means for moving the tapes in increments having approximately the length of the row of mold cavities, said transfer chamber being open at the top and bottom and receiving two oppositely movable blades of equal thickness, one of said blades acting as a transfer blade, and the other of said blades acting as an ejector blade, means to operate the transfer blade independently of the mold, means to operate said ejector blade independently of the mold, means to hold the ejector blade against movement when the mold is closed, and means to deliver a rod of molding material to the transfer chamber including a carrier slidable in a direction parallel to the tapes, said carrier being movable between a position outside the mold when the mold is closed, and a position between the halves of the mold when the mold is open.

5. Apparatus for molding two slide fastener stringers having plastic elements with open-sided recesses, said apparatus comprising mold halves separable in the plane of the slide fastener tapes, each mold half having two rows of mold cavities for the desired fastener elements and having additional cavities corresponding to end stops, a transfer chamber in said mold, said chamber being a long thin parallel-sided chamber extending collaterally between said rows of cavities and tapes, two rows of gate passages formed in said mold and connecting the end of each cavity with said transfer chamber, said chamber and gates opening into the parting plane of the mold, means to open and close the mold, tape feed means for moving the tapes in increments having approximately the length of the row of mold cavities, said transfer chamber being open at the top and bottom and receiving two oppositely movable blades, one of said blades acting as a transfer blade, and the other of said blades acting as an ejector blade, means to operate the transfer blade independently of the mold, means to operate said ejector blade independently of the mold, means to hold the ejector blade against movement when the mold is closed, means to deliver a rod of molding material to the transfer chamber including a carrier slidable in a direction parallel to the tapes, said carrier being movable between a position outside the mold when the mold is closed, and a position between the halves of the mold when the mold is open, and tape clamps separate from the mold extending longitudinally of the tape between the halves of the mold for clamping and holding the tapes outside the beaded edges of the tapes, together with means for moving said tape clamps relative to the mold, the said means for operating the tape clamps making the same useful for ejection of the molded elements from the mold cavities when the mold is opened.

6. Apparatus for molding a slide fastener stringer, said apparatus comprising mold halves separable in the plane of the slide fastener tape, each mold half having a row of mold cavities for the desired fastener elements, a transfer chamber in said mold, said chamber being a long thin parallel-sided chamber extending collaterally of the row of cavities, a row of gates formed in said mold and connecting the end of each cavity with said transfer chamber, said chamber and gates opening into the parting plane of the mold, a transfer blade movable in said transfer chamber to compress molding material therein and to thereby extrude the same through the gates into the cavities, tape clamps separate from the mold extending longitudinally of the tape between the halves of the mold for clamping and holding the tape outside the beaded edge of the tape, and means for moving said tape clamps relative to the mold.

7. Apparatus for molding two slide fastener stringers, said apparatus comprising mold halves separable in the plane of the slide fastener tapes, each mold half having two rows of mold cavities for the desired fastener elements, a chamber in said mold, said chamber being a long thin parallel-sided chamber in both mold halves extending collaterally between said rows of cavities, two rows of gates formed in said mold and connecting the end of each cavity with said chamber, the longitudinal discharge edge of said chamber and said gates opening into the parting plane of the mold, an elongated transfer blade, and an elongated ejector blade, both of said blades fitting and being slidably movable in said chamber in a direction transverse of the length of the blade and chamber and toward the rows of gates, in order to compress molding material therein and to thereby extrude the same through the gates into the cavities while the mold is closed, and in order to eject the residue when the mold is open.

8. Apparatus for molding two slide fastener stringers having plastic elements with open-sided recesses, said apparatus comprising mold halves separable in the plane of the slide fastener tapes, each mold half having two rows of mold cavities therealong for the desired fastener elements and having additional cavities corresponding to end stops, a chamber in said mold, said chamber being a long thin parallel-sided chamber in both mold halves extending collaterally between said rows of cavities, two rows of gates formed in said mold and connecting the end of each cavity with said chamber, the longitudinal discharge edge of said chamber and said gates opening into the parting plane of the mold, an elongated transfer blade, an elongated ejector blade, both of said blades fitting and being slidably movable in said chamber in a direction transverse of the length of the blade and chamber and toward the rows of gates, in order to compress molding material therein and to thereby extrude the same through the gates into the cavities while the mold is closed, and in order to eject the residue when the mold is open.

9. Apparatus for molding a slide fastener stringer, said apparatus comprising mold halves separable in the plane of the slide fastener tape, each mold half having a row of mold cavities for the desired fastener elements, a transfer chamber in the lower half of said mold, said chamber being a long thin parallel-sided chamber extending collaterally of the row of cavities, a row of gates formed in said mold and connecting the end of each cavity with said transfer chamber, a transfer blade in the lower half of said mold and movable upward in said transfer chamber to compress a long thin rod of molding material and to thereby extrude the same transversely of the rod through the gates and into the cavities, means to open and close the mold, means to deliver said rod of molding material between the halves of the mold into said transfer chamber while the mold is open, said rod having a length approximately equal to the length of the row of mold cavities, tape feed means for moving the tape in increments having approximately the length of the row of mold cavities while the mold is open, and independently operable means beneath the mold to actuate the transfer blade after the mold is closed.

10. Apparatus for molding two slide fastener stringers, said apparatus comprising mold halves separable in the plane of the slide fastener tapes, each mold half having two rows of mold cavities therealong for the desired fastener elements, a transfer chamber in the lower half of said mold, said chamber being a long thin parallel-sided chamber extending collaterally between said rows of cavities and tapes, two rows of gates formed in said mold and connecting the end of each cavity with said transfer chamber, said chamber and gates opening into the parting plane of the mold, a transfer blade in the lower half of said mold and movable upward in said transfer chamber to compress a rod of molding material and to thereby extrude the same transversely of the rod through the gates into the cavities, means to open and close the mold, means to deliver said rod of molding material between the halves of the mold into said transfer chamber while the mold is open, tape feed means for moving the tapes in increments having approximately the length of the row of mold cavities while the mold is open, and independently operable means beneath the mold to actuate the transfer blade after the mold is closed.

11. Apparatus for molding a slide fastener stringer having plastic elements with open-sided recesses, said apparatus comprising mold halves separable in the plane of the slide fastener tape, each mold half having a row of mold cavities for the desired fastener elements and having additional cavities corresponding to end stops, a transfer chamber in the lower half of said mold, said chamber being a long thin parallel-sided chamber extending collaterally of the row of cavities outside the ends of the cavities remote from the tape, a series of gate passages formed in said mold and connecting the end of each cavity with said transfer chamber, said chamber and gates opening into the parting plane of the mold, a transfer blade in the lower half of said mold and movable upward in said transfer chamber to compress a long thin rod of molding material and to thereby extrude the same transversely of the rod through the gates and into the cavities, means to open and close the mold, means to deliver said rod of molding material between the halves of the mold into said transfer chamber while the mold is open, said rod having a length approximately equal to the length of the row of mold cavities, tape feed means for moving the tape in increments having approximately the length of the row of mold cavities while the mold is open, and independently operable means to actuate the transfer blade after the mold is closed.

12. Apparatus for molding two slide fastener stringers having plastic elements with open-sided recesses, said apparatus comprising mold halves separable in the plane of the slide fastener tapes, each mold half having two rows of mold cavities for the desired fastener elements and having additional cavities corresponding to end stops, a transfer chamber in the lower half of said mold, said chamber being a long thin parallel-sided chamber extending collaterally between said rows of cavities and tapes, two rows of gate passages formed in said mold and connecting the end of each cavity with said transfer chamber, said chamber and gates opening into the parting plane of the mold, a transfer blade in the lower half of said mold and movable upward in said transfer chamber to compress a rod of molding material and to thereby extrude the same transversely of the rod through the gates into the cavities, means to open and close the mold, means to deliver said rod of molding material between the halves of the mold into said transfer chamber while the mold is open, tape feed means for moving the tapes in increments having approximately the length of the row of mold cavities while the mold is open, and independently operable means to actuate the transfer blade after the mold is closed.

13. Apparatus for molding two slide fastener stringers having plastic elements with open-sided recesses, said apparatus comprising mold halves separable in the plane of the slide fastener tapes, each mold half having two rows of mold cavities therealong for the desired fastener elements and having additional cavities corresponding to end stops, a chamber in said mold, said chamber being a long thin parallel-sided chamber extending collaterally between said rows of cavities, two rows of gates formed in said mold and connecting the end of each cavity with said chamber, the longitudinal discharge edge of said chamber and said gates opening into the parting plane of the mold, and two elongated blades fitting and slidably movable in said chamber in a direction transverse of the length of the blade and chamber and toward the rows of gates in order to compress molding material therein and to thereby extrude the same through the gates into the cavities, said chamber being open at the top and bottom to receive the two oppositely movable blades, one of said blades acting as a transfer blade, and the other of said blades acting as an ejector blade.

14. Apparatus for molding a slide fastener stringer, said apparatus comprising mold halves separable in the plane of the slide fastener tape, each mold half having a row of mold cavities for the desired fastener elements, a chamber in said mold, said chamber being a long thin parallel-sided chamber extending collaterally of the row of cavities, a row of gates formed in said mold and connecting the end of each cavity with said chamber, two blades fitting said chamber to compress a long thin rod of molding material and to thereby extrude the same transversely of the rod through the gates and into the cavities, means to deliver said rod of molding material into said chamber, said rod having a length approximately equal to the length of the row of mold cavities, tape feed means for moving the tape in increments having approximately the length of the row of mold cavities, the chamber being open at the top and bottom to receive said two oppositely movable blades, one of said blades acting as a transfer blade, and the other of said blades acting as an ejector blade, means to open and close the mold, independently operable means to actuate the transfer blade, and additional independently operable means for actuating said ejector blade.

15. Apparatus for molding two slide fastener stringers having plastic elements with open-sided recesses, said apparatus comprising mold halves separable in the plane of the slide fastener tapes, each mold half having two rows of mold cavities for the desired fastener elements and having additional cavities corresponding to end stops, a chamber in said mold, said chamber being a long thin parallel-sided chamber extending collaterally between said rows of cavities and tapes, two rows of gate passages formed in said mold and connecting the end of each cavity with said chamber, said chamber and gates opening into the parting plane of the mold, two blades fitting said chamber to compress a rod of molding material and to thereby extrude the same transversely of the rod through the gates into the cavities, means to deliver said rod of molding material into said chamber, tape feed means for moving the tapes in increments having approximately the length of the row of mold cavities, the chamber being open at the top and bottom to receive said two oppositely movable blades, one of said blades acting as a transfer blade, and the other of said blades acting as an ejector blade, means to open and close the mold, independently operable means to actuate the transfer blade, additional means for operating said ejector blade independently of the mold, and means to hold the ejector blade against movement when the mold is closed.

16. Apparatus for molding a slide fastener stringer, said apparatus comprising mold halves separable in the plane of the slide fastener tape, each mold half having a row of mold cavities for the desired fastener elements, a transfer chamber in the lower half of said mold, said chamber being a long thin parallel-sided chamber extending collaterally of the row of cavities, a row of gates formed in said mold and connecting the end of each cavity with said transfer chamber, a transfer blade in the lower half of said mold and movable upward in said transfer chamber to compress a long thin rod of molding material and to thereby extrude the same transversely of the rod through the gates and into the cavities, means to open and close the mold, means to deliver said rod of molding material between the halves of the mold into said transfer chamber while the mold is open, said rod having a length approximately equal to the length of the row of mold cavities, the means to deliver said rod including a carrier slidable longitudinally in a direction longitudinal of the tapes, said carrier being movable between a position outside the mold when the mold is closed, and a position between the halves of the mold when the mold is open, tape feed means for moving the tape in increments having approximately the length of the row of mold cavities while the mold is open, and independently operable means to actuate the transfer blade after the mold is closed.

17. Apparatus for molding two slide fastener stringers having plastic elements with open-sided recesses, said apparatus comprising mold halves separable in the plane of the slide fastener tapes, each mold half having two rows of mold cavities for the desired fastener elements and having additional cavities corresponding to end stops, a transfer chamber in the lower half of said mold, said chamber being a long thin parallel-sided chamber extending collaterally between said rows of cavities and tapes, two rows of gate passages formed in said mold and connecting the end of each cavity with said transfer chamber, said chamber and gates opening into the parting plane of the mold, a transfer blade in the lower half of said mold and movable upward in said transfer chamber to compress a rod of molding material and to thereby extrude the same transversely of the rod through the gates into the cavities, means to open and close the mold, means to deliver said rod of molding material into said transfer chamber, the means to deliver said rod including a carrier slidable longitudinally in a direction longitudinal of the tapes, said carrier being movable between a position outside the mold when the mold is closed, and a position between the halves of the mold when the mold is open, tape feed means for moving the tapes in increments having approximately the length of the row of mold cavities while the mold is open, and independently operable means to actuate the transfer blade after the mold is closed.

18. Apparatus for molding two slide fastener stringers having plastic elements with open-sided recesses, said apparatus comprising mold halves separable in the plane of the slide fastener tapes, each mold half having two rows of mold cavities therealong for the desired fastener elements and having additional cavities corresponding to end stops, a transfer chamber in said mold, said chamber being a long thin parallel-sided chamber extending collaterally between said rows of cavities, two rows of gates formed in said mold and connecting the end of each cavity with said transfer chamber, the longitudinal discharge edge of said chamber and said gates opening into the parting plane of the mold, an elongated transfer blade fitting and slidably movable in said transfer chamber in a direction transverse of the length of the blade and chamber and toward the rows of gates in order to compress molding material therein and to thereby extrude the same through the gates into the cavities, tape clamps separate from the mold halves extending longitudinally of the tape between the halves of the mold for clamping and holding the tapes outside the beaded edges of the tapes, and means for moving said tape clamps relative to the mold halves, whereby said tape clamps act as ejector means for separation of the tapes and molded elements from the mold when the mold is opened.

19. Apparatus for molding a slide fastener stringer, said apparatus comprising mold halves separable in the plane of the slide fastener tape, each mold half having a row of mold cavities for the desired fastener elements, a transfer chamber in said mold, said chamber being a long thin parallel-sided chamber extending collaterally of the row of cavities, a row of gates formed in said mold and connecting the end of each cavity with said transfer chamber, a transfer blade movable in said transfer chamber to compress a long thin rod of molding material and to thereby extrude the same transversely of the rod through the gates and into the cavities, means to open and close the mold, independently operable means to actuate the transfer blade, means to deliver said rod of molding material into said transfer chamber, said rod having a length approximately equal to the length of the row of mold cavities, tape feed means for moving the tape in increments having approximately the length of the row of mold cavities, tape clamps separate from the mold halves extending longitudinally of the tape between the halves of the mold for clamping and holding the tape outside the beaded edge of the tape, and means for moving said tape clamps relative to the mold halves, whereby said tape clamps act as ejector means for separation of the tape 20. Apparatus for molding two slide fastener stringers having plastic elements with open-sided recesses, said apparatus comprising mold halves separable in the plane of the slide fastener tapes, each mold half having two rows of mold cavities for the desired fastener elements and having additional cavities corresponding to end stops, a transfer chamber in said mold, said chamber being a long thin parallel-sided chamber extending collaterally between said rows of cavities and tapes, two rows of gate passages formed in said mold and connecting the end of each cavity with said transfer chamber, said chamber and gates opening into the parting plane of the mold, a transfer blade movable in said transfer chamber to compress a rod of molding material and to thereby extrude the same transversely of the rod through the gates into the cavities, means to open and close the mold, independently operable means to actuate the transfer blade, means to deliver said rod of molding material into said transfer chamber, tape feed means for moving the tapes in increments having approximately the length of the row of mold cavities, tape clamps separate from the mold halves extending longitudinally of the tape between the halves of the mold for clamping and holding the tapes outside the beaded edges of the tapes, and means for moving said tape clamps relative to the mold halves, said mold halves being recessed to mate with the tape clamps at sloping pressure surfaces so directed that the clamps are urged against the tapes between halves of the mold when the mold is closed, the aforesaid means for moving the tape clamps relative to the mold halves acting as ejector means for separation of the tapes and molded elements from the mold when the mold is opened.

21. Apparatus for molding a slide fastener stringer, said apparatus comprising mold halves separable in the plane of the slide fastener tape, each mold half having a row of mold cavities for the desired fastener elements, a transfer chamber in the lower half of said mold, said chamber being a long thin parallel-sided chamber extending collaterally of the row of cavities, a row of gates formed in said mold and connecting the end of each cavity with said transfer chamber, a transfer blade in the lower half of said mold and movable upward in said transfer chamber to compress a long thin rod of molding material and to thereby extrude the same transversely of the rod through the gates and into the cavities, means to open and close the mold, independently operable means to actuate the transfer blade, means to deliver said rod of molding material into said transfer chamber, said rod having a length approximately equal to the length of the row of mold cavities, the means to deliver said rod including a carrier slidable in a direction parallel to the tapes, said carrier being movable between a position outside the mold when the mold is closed, and a position between the halves of the mold when the mold is open, tape feed means for moving the tape in increments having approximately the length of the row of mold cavities, tape clamps separate from the mold halves extending longitudinally of the tape between the halves of the mold for clamping and holding the tape outside the beaded edge of the tape, and means for moving said tape clamps relative to the mold halves to act as ejector means for separation of the tape and molded elements from the mold when the mold is opened.

22. Apparatus for molding two slide fastener stringers having plastic elements with open-sided recesses, said apparatus comprising mold halves separable in the plane of the slide fastener tapes, each mold half having two rows of mold cavities for the desired fastener elements and having additional cavities corresponding to end stops, a transfer chamber in the lower half of said mold, said chamber being a long thin parallel-sided chamber extending collaterally between said rows of cavities and tapes, two rows of gate passages formed in said mold and connecting the end of each cavity with said transfer chamber, said chamber and gates opening into the parting plane of the mold, a transfer blade in the lower half of said mold and movable upward in said transfer chamber to compress a rod of molding material and to thereby extrude the same transversely of the rod through the gates into the cavities, means to open and close the mold, independently operable means to actuate the transfer blade, means to deliver said rod of molding material into said transfer chamber, the means to deliver said rod including a carrier slidable longitudinally in a direction longitudinal of the tapes, said carrier being movable between a position outside the mold when the mold is closed, and a position between the halves of the mold when the mold is open, and tape feed means for moving the tapes in increments having approximately the length of the row of mold cavities, tape clamps separate from the mold halves extending longitudinally of the tape between the halves of the mold for clamping and holding the tapes outside the beaded edges of the tapes, and means for moving said tape clamps relative to the mold halves, whereby said tape clamps act as ejector means for separation of the tapes and molded elements from the mold when the mold is opened.

23. Apparatus for molding a slide fastener stringer having plastic elements with open-sided recesses, said apparatus comprising mold halves separable in the plane of the slide fastener tape, each mold half having a row of mold cavities for the desired fastener elements, means to open and close the mold, tape feed means for moving the tape in increments having approximately the length of the row of mold cavities, and means to deliver a long slender rod of molding material to the mold, said rod having a length approximately equal to the length of the row of cavities, said means including a carrier slidable longitudinally in a direction longitudinal of the tapes, said carrier being movable between a position outside the mold when the mold is closed, and a position between the halves of the mold when the mold is open.

24. Apparatus for molding a slide fastener stringer having plastic elements with open-sided recesses, said apparatus comprising upper and lower mold halves separable in the plane of the slide fastener tape, each mold half having a row of mold cavities for the desired fastener elements and having additional cavities corresponding to end stops, the upper mold half having ejector means, means to open and close the mold, tape feed means for moving the tape in increments having approximately the length of the row of mold cavities, and means to deliver a long slender rod of molding material to the mold, said rod having a length approximately equal to the length of the row of cavities, said means including a carrier slidable in a direction parallel to the tapes, said carrier being movable between a position outside the mold when the mold is closed and a position between the halves of the mold when the mold is open, said carrier including a receptacle for carrying the rod of molding material, and said ejector means being movable downward to transfer the said rod to the lower half of the mold before the molding operation, in addition to its normal ejector function after the molding operation.

25. Apparatus for molding a slide fastener stringer, said apparatus comprising mold halves separable in the plane of the slide fastener tape, each mold half having a long row of mold cavities for the desired fastener elements, tape clamps separate from the mold halves extending longitudinally of the tape between the halves of the mold for clamping and holding the tapes outside the beaded edges of the tapes, and means for moving said tape clamps relative to the mold halves, whereby said tape clamps act as ejector means for separation of the tapes and molded elements from the mold when the mold is opened, said mold halves being recessed to mate with the tape clamps.

26. Apparatus for molding a slide fastener stringer, said apparatus comprising mold halves separable in the plane of the slide fastener tape, each mold half having a long row of mold cavities for the desired fastener elements, tape clamps separate from the mold halves extending longitudinally of the tape between the halves of the mold for clamping and holding the tapes outside the beaded edges of the tapes, and means for moving said tape clamps relative to the mold halves, whereby said tape clamps act as ejector means for separation of the tapes and molded elements from the mold when the mold is opened, said mold halves being recessed to mate with the tape clamps, the outer ends of the mold cavities opening into said recesses, and the adjacent inner edges of the clamps functioning to close the said open ends of the recesses.

27. Apparatus for molding a slide fastener stringer, said apparatus comprising mold halves separable in the plane of the slide fastener tape, each mold half having a long row of mold cavities for the desired fastener elements, tape clamps separate from the mold halves extending longitudinally of the tape between the halves of the mold for clamping and holding the tapes outside the beaded edges of the tapes, and means for moving said tape clamps relative to the mold halves, whereby said tape clamps act as ejector means for separation of the tapes and molded elements from the mold when the mold is opened, said mold halves being recessed to mate with the tape clamps at sloping pressure surfaces, the outer ends of the mold cavities opening into said recesses, and the adjacent inner edges of the clamps functioning to close the said open ends of the recesses, the aforesaid sloping pressure surfaces being so directed that the leading edges of the clamps are tightly pressed in lateral closing direction against the mold at the open ends of the recesses in order to effectively close the same when the mold closes against the tape clamps.

28. Apparatus for molding a slide fastener stringer, said apparatus comprising mold halves separable in the plane of the slide fastener tape, each mold half having a long row of mold cavities for the desired fastener elements, tape clamps separate from the mold halves extending longitudinally of the tape between the halves of the mold for clamping and holding the tapes outside the beaded edges of the tapes, means for moving said tape clamps relative to the mold halves, whereby said tape clamps act as ejector means for separation of the tapes and molded elements from the mold when the mold is opened, said mold halves being recessed to mate with the tape clamps, the outer ends of the mold cavities opening into said recesses, and the adjacent inner edges of the clamps functioning to seal the said open ends of the recesses, said clamps and mating recesses being generally triangular shaped in cross-section, with the inner edge of the triangle truncated to form the aforesaid sealing edge, and with the outer side of the triangle steeply sloped and the inner side more gradually sloped so that there is an extra inward component of pressure when the mold closes against the tape clamps.

29. Apparatus for molding two slide fastener stringers having plastic elements with open-sided recesses, said apparatus comprising mold halves separable in the plane of the slide fastener tapes, each mold half having two rows of mold cavities therealong for the desired fastener elements and having additional cavities corresponding to end stops, a chamber in said mold, said chamber being a long thin parallel-sided chamber in both mold halves extending collaterally between said rows of cavities, two rows of gates formed in said mold and connecting the end of each cavity with said chamber, the longitudinal discharge edge of said chamber and said gates opening into the parting plane of the mold, an elongated transfer blade, and an elongated ejector blade, both of said blades fitting and being slidably movable in said chamber in a direction transverse of the length of the blade and chamber and toward the rows of gates, in order to compress molding material therein and to thereby extrude the same through the gates into the cavities while the mold is closed, and in order to eject the residue when the mold is open, tape clamps separate from the mold halves extending longitudinally of the tape between the halves of the mold for clamping and holding the tapes outside the beaded edges of the tapes, and means for moving said tape clamps relative to the mold halves, whereby said tape clamps act as additional ejector means for separation of the tapes and molded elements from the mold when the mold is opened.

JOSEPH N. KUZMICK.

REFERENCES CITED

The following references are of record in the file of this patent:

UNITED STATES PATENTS

| Number | Name | Date |
|---|---|---|
| 1,961,941 | Pack | June 5, 1934 |
| 1,975,966 | Morin et al. | Oct. 9, 1934 |
| 1,980,333 | Haessler | Nov. 13, 1934 |
| 2,150,097 | Gunderson | Mar. 7, 1939 |
| 2,184,265 | Winterhalter | Dec. 19, 1939 |
| 2,224,980 | Morin | Dec. 17, 1940 |
| 2,460,964 | Adair et al. | Feb. 8, 1949 |

Certificate of Correction

Patent No. 2,543,111                                                   February 27, 1951

JOSEPH N. KUZMICK

It is hereby certified that error appears in the printed specification of the above numbered patent requiring correction as follows:

Column 2, line 45, after "1947" strike out the comma and words ", now abandoned";

and that the said Letters Patent should be read as corrected above, so that the same may conform to the record of the case in the Patent Office.

Signed and sealed this 12th day of June, A. D. 1951.

[SEAL]

THOMAS F. MURPHY,
*Assistant Commissioner of Patents.*